Jan. 12, 1960 — W. VOGEL ET AL — 2,920,613
SWIRL PRODUCING INLET PORT FOR INTERNAL COMBUSTION ENGINE
Filed Dec. 9, 1957

INVENTORS
Wolfgang Vogel
Horst Lachmann

Jan. 12, 1960   W. VOGEL ET AL   2,920,613
SWIRL PRODUCING INLET PORT FOR INTERNAL COMBUSTION ENGINE
Filed Dec. 9, 1957   2 Sheets-Sheet 2

INVENTORS,
WOLGANG VOGEL
HORST LACHMANN
BY Bailey, Stephens & Huettig
ATTORNEY

United States Patent Office 2,920,613
Patented Jan. 12, 1960

2,920,613

SWIRL PRODUCING INLET PORT FOR INTERNAL COMBUSTION ENGINE

Wolfgang Vogel, Starnberg, and Horst Lachmann, Rosstal, Germany

Application December 9, 1957, Serial No. 701,633

Claims priority, application Germany December 12, 1956

5 Claims. (Cl. 123—188)

This invention relates to an internal combustion engine having a cylinder head fitted with an intake valve mounted eccentric to the cylinder axis and a gas swirl producing intake duct for said valve. This construction is such as disclosed generally in our copending application Serial No. 523,851, filed July 22, 1955, now abandoned. In particular, the invention is directed to an auxiliary device for regulating the direction of air swirl created in the intake duct and is for the purpose of adjusting the speed of the gas swirl as required by the operation of the engine.

It is known that various engine speeds require different gas swirl values in the cylinder head in order to obtain optimum results. It is also known that in fuel injection compression ignition internal combustion engines a too great an air swirl will cause starting difficulties, especially when the engine is started at a temperature below 0° C. It is therefore apparent that it is desirous to be able to adjust the gas swirl in the cylinder over wide limits.

Up to now, this adjusting problem has been solved by the use of so-called mask valves or analoguous devices on the circumference of the valve or valve seat, respectively, which did not necessitate any change in the gas intake duct for the purpose of varying the gas swirl in the cylinder. By turning the mask around the valve axis, the gas swirl can be either increased to a certain upper limit or decreased to a zero value from a recognized favorable value under standard conditions. Furthermore, the swirl can be reversed entirely to run in an opposite direction. By so acting on the straight line flow of the intake gas, the swirl direction is varied by a change in the asymmetry of the opening into the cylinder actually passed through by the intake gas with reference to the vertical plane passing through the cylinder and valve axis in such a way that some other part of the valve circumference is always covered.

Still greater difficulties occur when the gas swirl is produced by a special shape of the intake duct. The air swirl when viewed from the outside is shown as a complete symmetrical rotation. The necessary asymmetry of all unit gas flow lines with reference to the above-mentioned vertical plane for producing the swirl in the cylinder is not effected in this case by the position of the opening diameter into the cylinder, but by the gas flow direction on each particular point of the diameter. If now the quantity of air swirl should be varied, the direction in which the single gas flow lines leave the valve opening are influenced to a change in direction.

Should, however, for the obtaining of technical advantages in the production and operation of the engine, completely rotational symmetrical valves and valve seats be used as compared to one-sided masked control devices, then the influencing of the gas flow as viewed in the direction of the flow has to be moved further away from the cylinder. An accessible and constructionally good position for the gas flow influencing control devices is at the opening of the gas intake duct by means of a simple mounting. This is the place where the air or fuel mixture, respectively, occurs as a stream flowing through and passing into the cylinder from the intake manifold.

According to this invention, a gas flow influencing control device for regulating the gas swirl is mounted on the intake port for the intake gas duct. This device is made rotatable for controlling its adjustment about its longitudinal axis. The control device is arranged and constructed as a hollow shell having the shape of a quarter of a sphere with a curved guiding surface arranged in the direction of the gas flow so that at different positions the gas flow lines are varied as they are passed through the valve opening into the cylinder with reference to the above-mentioned vertical plane. Therefore, a different air swirl is produced in the cylinder at each position of the control device. From a control device setting most suitable for the normal engine operation, the setting of the device can be varied for certain engine operations, as for cold starting, and an automatic arrangement of the swirl control can thereby be easily effected.

The means by which the objects of the invention are obtained are disclosed more fully with reference to the accompanying drawings, in which.

Figure 1:
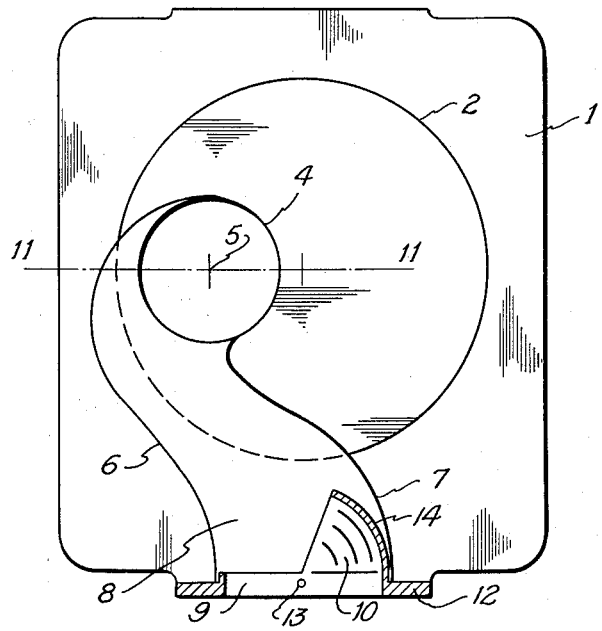
Figure 1 is a plan view of the gas intake duct mounted over a cylinder with the swirl control device shown in section.

The cylinder head 1 of an internal combustion engine is shown covering the engine cylinder 2 having a longitudinal axis 3. The generally cone-shaped valve space is indicated by the circle 4 and is positioned eccentric to the cylinder axis 3 and is adapted to hold the intake valve on the valve seat milled in the cylinder head. Center 5 of circle 4 corresponds with the intake valve axis. The gas duct wall contours 6 and 7 form the gas intake duct 8 which leads the gas in a geometrical direction into valve space 4 and thereby creates a high swirl in the cylinder by full use of the valve intake space without the latter being obstructed by a mask, and in a manner described in application Serial No. 523,851. The gas intake port 9 has mounted therein a gas control device 10 in such a way that by adjusting its position, as by turning it, other flow conditions can be caused in the duct 8 between port 9 and valve opening 4. Consequently, a different asymmetry of the gas flow lines passing through valve space 4 occurs with reference to the vertical plane 11—11 containing cylinder axis 3 and valve axis 5, and this change produces a different form of gas swirl in cylinder 2.

Figure 2:
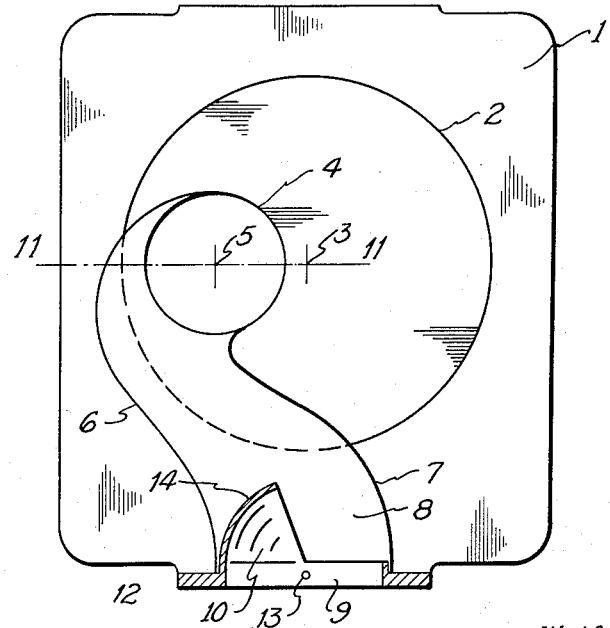
Figure 2 is a similar view showing another setting of the gas swirl control device.

In the control device shown in Figures 1 and 2, the device 10 consists of a hollow shell having the shape of a quarter of a sphere which is turnably mounted around the center 13 of port 9 and in the plane of flange 12. The curved guide surface 14 of device 10 extends inwardly from the plane of flange 12 so that its concave inside surface guides the intake air or fuel mixture, respectively. In the approximate position as shown in Figure 1, the gas control device 10 causes the intake air or fuel mixture, respectively, to flow principally along the outer wall 6 of duct 8. This causes the gas to flow through opening 4 with such a total course of flow lines to form a proportionally high swirl in cylinder 2. On the other hand, in the control device setting shown in Figure 2, the air is forced to pass principally along wall 7 which results in a proportionately low swirl in the cylinder.

Figure 3:
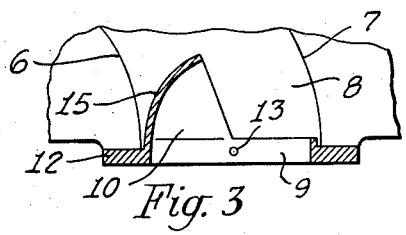
Figure 3 is a cross-sectional view of the swirl control device having an elliptical shape.
Figure 4:
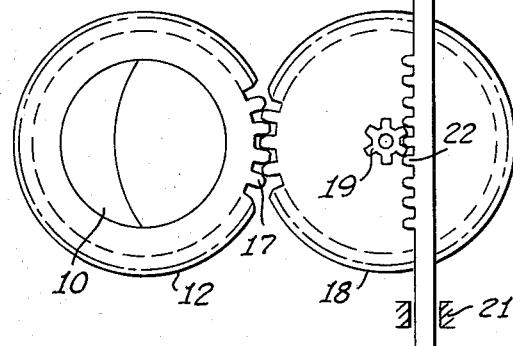
Figure 4 is a view similar to Figure 3 and showing the swirl control device with a parabolic shape.
Figure 4:
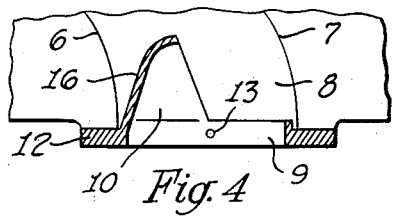

The invention is not limited to the above-disclosed example. The curved guide surface of control device 10 can have, instead of the spherical shape, some other shape, such as the elliptically shaped device 15 of Figure 3 or the parabolically shaped device 16 of Figure 4.

Figure 5:
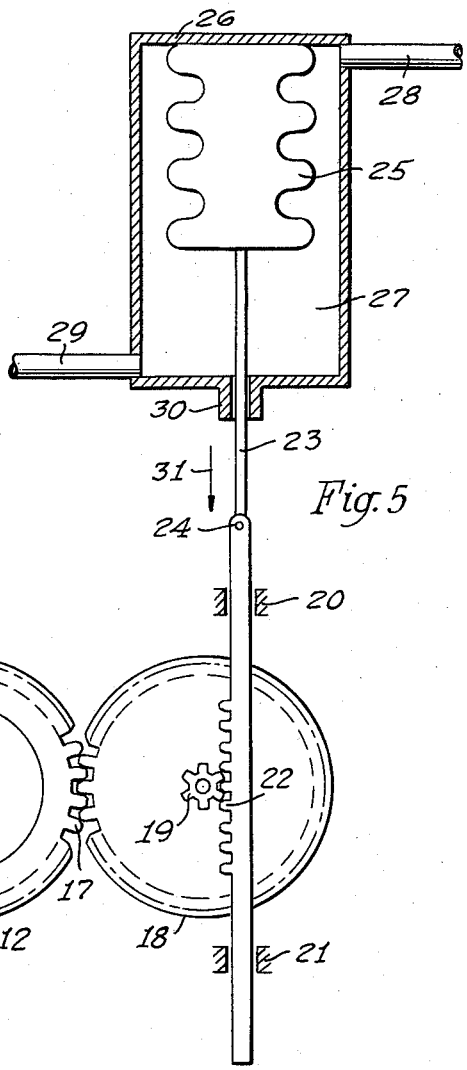
Figure 5 is an elevational view partly in section and showing an engine temperature responsive means attached to the swirl control device.

In Figure 5, the turning of device 10 is automatically controlled by the engine temperature. Flange 12 of device 10 is provided with gear teeth 17 which mesh with the teeth of gear 18. Pinion 19 attached to gear 18 meshes with rack 22 slidably supported in guides 20 and 21. A rod 23, having a pivotal connection 24 with rack 22, is fastened to bellows 25 contained in housing 26. inlet pipe 28 and outlet pipe 29 joined to housing 26 are for circulating the fluid of the engine cooling system through the container in contact with bellows 25, the latter being filled with a heat expansible liquid such as glycerine. During engine cold starting, bellows 25 is contracted, thus pulling up rack 22 and through the gear train rotating device 10 to engine starting position. As the engine heats, the fluid passing into container 26 through pipe 28 heats bellows 25 and its expansion pushes rack 22 downwardly to rotate device 10 to engine running position.

All the above constructional forms are contemplated within the disclosure of this invention.

Having now described the means by which the objects of the invention are obtained, we claim:

1. An intake gas swirl control device for an internal combustion engine comprising a cylinder head mounted over a cylinder, an intake valve eccentric to the cylinder axis, a curved intake duct leading to said valve for producing a gas swirl in said cylinder, and a gas direction flow control device adjustably mounted in the intake port of said duct.

2. A device as in claim 1, said device comprising a hollow quarter spherical shell rotatably mounted concentric with said port and having a concave gas deflecting surface in the path of the gas flow within said duct.

3. A device as in claim 2, further comprising engine temperature responsive means connected to said shell for rotating said shell.

4. A device as in claim 1, said device comprising an elliptical shell rotatably mounted concentric with said port and having a concave deflecting surface in the path of the gas flow within said duct.

5. A device as in claim 1, said device comprising a parabolical shell rotatably mounted concentric with said port and having a concave deflecting surface in the path of the gas flow within said duct.

References Cited in the file of this patent

FOREIGN PATENTS

| | | |
|---|---|---|
| 226,800 | Great Britain | Dec. 8, 1924 |
| 1,134,506 | France | Dec. 3, 1956 |